Aug. 22, 1950  F. W. GRAFF  2,519,901
CYCLE CHAIN ADJUSTER
Filed June 10, 1948
Fig. 1.
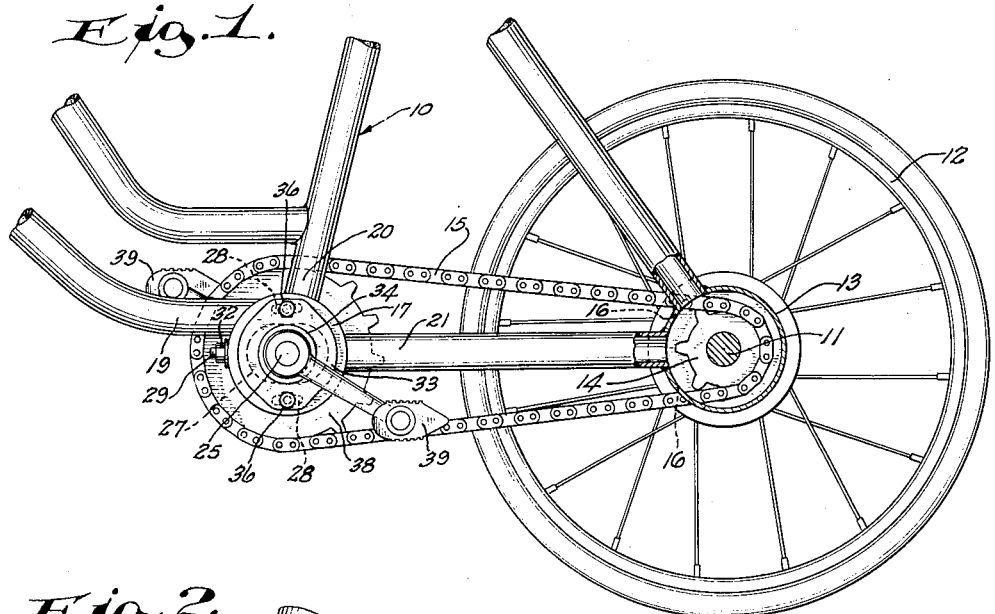
Fig. 2.
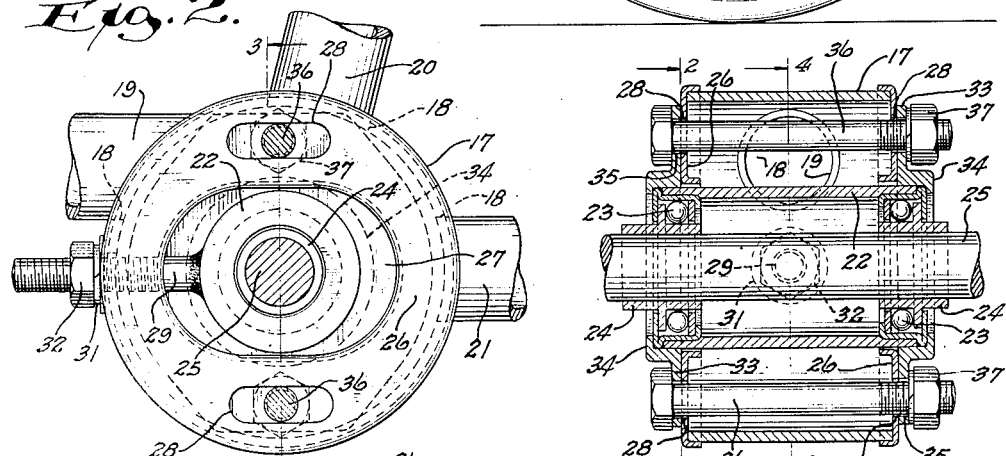
Fig. 3.
Fig. 4.
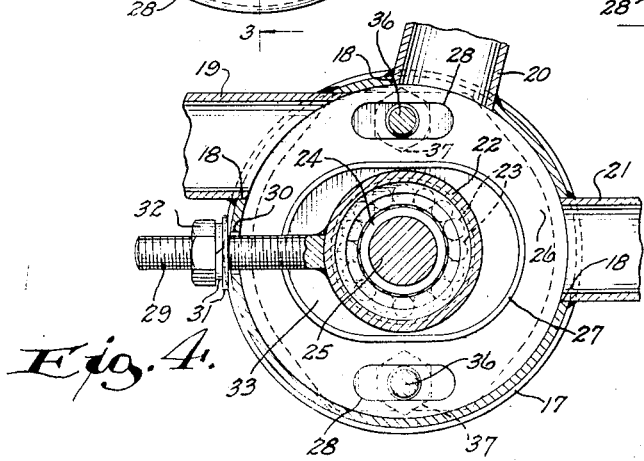
INVENTOR.
Frederick W. Graff,
BY
Morsell & Morsell
ATTORNEYS.

Patented Aug. 22, 1950

2,519,901

UNITED STATES PATENT OFFICE 2,519,901

CYCLE CHAIN ADJUSTER

Frederick W. Graff, Sheboygan, Wis., assignor to Garton Toy Company, Sheboygan, Wis., a corporation of Wisconsin Application June 10, 1948, Serial No. 32,081

3 Claims. (Cl. 74—242.14)

This invention relates to improvements in cycle chain adjusters.

In conventional cycle structures motive power is transmitted from the pedal-equipped crank to the rear axle by an endless chain trained over sprockets. The chain will require adjustments to maintain it in the proper degree of tautness, and heretofore this has been accomplished by mounting the rear axle of the cycle in slots or forks in the rear of the frame with cooperating adjusting bolts to shift the axle fore and aft to thereby tighten or loosen the chain. The conventional cycle chain adjusting structure mentioned is open to a number of objections and disadvantages. In the first place adjustment of the chain through movement of the rear axle required manipulation and equalization of two bolts which were inconvenient to apply a tool to and which, if not adjusted precisely equally would result in non-alinement of the rear wheel or wheels of the cycle. Also a complicated rear fork construction was required because of the slots.

With the above in mind it is a primary object of the present invention to overcome the objections and disadvantages inherent to conventional structures of the character described by providing a chain adjuster for cycles which displaces the usual pedal crank hub and substitutes a mounting for the intermediate portion of a pedal crank which can be easily adjusted fore and aft to shift with it the forward chain sprocket to thus adjust the chain, the rear wheel axle and wheel remaining unaffected whereby mis-alinement of the rear wheel or wheels is not a problem.

A further object of the invention is to provide a cycle chain adjuster which employs but a single, very accessible adjusting bolt, and chain adjustments may be accomplished by a novice without throwing any parts of the assemblage out of alinement.

A further object of the invention is to provide a cycle chain adjuster in which the pedal crank is shiftable in a rectilineal path.

A further object of the invention is to provide a cycle chain adjuster which may be readily incorporated in a two or three wheeled pedal-operated cycle in a manner so that the cycle structure is extremely neat and simple, which is strong and durable and easy to manipulate, which is relatively inexpensive, and which is well adapted for the purposes described.

With the above and other objects in view the invention consists of the improved cycle chain adjuster, and its parts and combinations as set forth in the claims, and all equivalents thereof.

In the accompanying drawing in which the same reference characters indicate the same parts in all of the views:

Fig. 1 is a fragmentary side view of a pedal operated cycle equipped with the improved chain adjuster, parts being broken away and in section;

Fig. 2 is an enlarged, fragmentary view of the intermediate frame portion of a cycle equipped with the improved chain adjuster which carries the pedal crank, portions being shown in section and taken on line 2—2 of Fig. 3;

Fig. 3 is a sectional view taken on line 3—3 of Fig. 2; and

Fig. 4 is a sectional view taken on line 4—4 of Fig. 3.

Referring now more particularly to the drawing it will appear that a cycle frame is indicated generally by the numeral 10. The improved chain adjuster is applicable to any type of pedal-operated cycle and as will be noted from Fig. 1, for purposes of illustration the cycle here shown is of the type wherein the rear axle 11, which is driven, is revolubly mounted in the rear lower portion of the frame 10 and carries fast thereon driven wheels 12. Fast on the rear axle 11 and housed within a shell or casing 13 therefor is a small sprocket 14 engaged by the rear end portion of an endless chain 15. The latter extends forwardly through slots 16 therefor in the shell 13.

The improved chain adjustor includes a hollow drum-like casing 17 having, in its annular wall, openings 18 which are entered by the end portions of frame bars 19, 20 and 21, which end portions of said frame bars are welded or otherwise secured to the stock of the casing 17 surrounding said openings, as is shown in Fig. 4, whereby said adjuster casing is affixed to the lower intermediate portion of the cycle frame.

A crank hub is indicated by the numeral 22 and the same houses ball bearings 23 which revolubly engage crank sleeves 24 positioned axially of said crank hub and extending beyond the opposite ends thereof. Having a force fit within the crank sleeves 24 is the intermediate portion of a pedal crank 25 projecting laterally of both ends of the hub and sleeves. Closing the opposite faces or ends of the casing 17 are flanged cover plates 26, each having a centrally located elongated, ovate opening 27 through which the opposite ends of the crank hub adjustably project. Each cover plate 26 is also formed, above and below its opening 27, with an elongated connecting bolt slot 28. Affixed to the crank hub 22 intermediate its ends is the inner end of a hub adjusting bolt 29. The latter extends outwardly through an opening 30 therefor in the annular wall of the casing 17. On the outwardly projecting threaded shank portion of the bolt 29 are suitable washers 31 and an adjusting nut 32.

The chain adjuster assemblage is completed by outer collar plates 33 applied exteriorly of the plates 26 and having central flanged collar portions 34 which receive and engage the outer extremities of the crank hub 22. Holes 35 in said plates 33 register with the slots 28 in the plates 26 and receive elongated connecting bolts 36 whereby the entire chain adjuster assemblage is detachably and adjustably maintained in assembled condition. The outer threaded extremities of said bolts 36 carry nuts 37 which may be loosened when adjustments are to be made so that the shank portions of the bolts may shift in the plate slots 28.

As will be noted from Fig. 1 an end of the intermediate portion of the pedal crank 25 carries fast thereon a large sprocket 38. A forward portion of the endless chain 15 engages said sprocket 38. The pedal crank is turned by foot power applied to the pedals 39 and the large sprocket is thereby turned with the driving power being transmited to the rear axle 11 and the wheels 12 by the chain 15. It is the objective to the present invention to provide easily operated and readily accessible means for tightening or loosening said chain without throwing the wheels or rear axle out of their proper alinement. The improved chain adjuster provides for this and functions through movement forwardly or rearwardly in a desirable rectilinear path.

Obviously, to accomplish an adjustment of the chain 15 the nut 32 on the hub adjusting bolt 29 should be turned inwardly or outwardly by a tool applied thereto, depending on whether the chain is to be tightened or loosened. The drumlike casing 17, being affixed to the frame 10, remains stationary and the connected assemblage which includes the crank hub 22, the crank sleeves 24, the pedal crank 25, the pairs of plates 26 and 33, and the elongated connecting bolts 36 is drawn fore or aft the desired distance to accomplish the proper adjustment of the chain. The plate slots 28 permit this movement and hence, before making the adjustment, the nuts 37 on the connecting bolts 36 should be loosened slightly. Also during the adjusting movement the ovate openings 27 in the casing cover plates 26 accommodate back and forth movement of the crank hub 22 and parts carried thereby.

From the foregoing description it will be evident that the improved cycle chain adjuster is readily applicable to various types of cycles, results in a simplified rear frame construction, is easy to manipulate, and is well adapted for the purposes described.

What is claimed as the invention is:

1. A cycle chain adjuster, comprising a cycle frame-carried casing, a hub member, pin and slot means operatively mounting the hub member in said casing for back and forth adjustments in a path transverse to the axis of the hub member, said casing having an opening in its wall, a bolt fixed to said hub at right angles to the axis of said hub and projecting slidably through said casing opening, a nut threaded onto the outer end portion of said bolt adjacent said casing wall, a crank revolubly mounted through said hub member, a sprocket fast on said crank, and a motion transmitting chain engaging said sprocket.

2. A cycle chain adjuster, comprising a cycle frame-carried drum-like casing, a hub member, means operatively mounting the hub member in said casing for back and forth adjustments in a rectilinear path transverse to the axis of the hub member, manually operated means to effect back and forth adjustments of said hub member and to secure the same in a position of adjustment, a pedal crank revolubly mounted through said hub member and casing and projecting beyond both ends of the casing, anti-friction devices interposed between the pedal crank and the hub member, a sprocket fast on a portion of said crank exteriorly of said casing, and a motion transmitting chain engaging said sprocket and adjustable through back and forth movements of the hub member.

3. The combination with a cycle frame carrying a rear driven axle with a sprocket fast thereon and a motion transmitting endless chain extending forwardly from said sprocket, of a device for adjusting the tension of said chain, comprising a drum-like casing fixedly carried by a lower intermediate portion of the cycle frame, a hub member, the axis of said hub member being parallel to said rear axle, pin and slot means operatively mounting the hub member in said casing for back and forth adjustments in a path transverse to the axis of the hub member, said casing having an opening in its wall, a bolt fixed to said hub at right angles to the axis of said hub and projecting slidably through said casing opening, a nut threaded onto the outer end portion of said bolt to impinge against the casing, a pedal crank revolubly mounted through said hub member and casing, anti-friction devices interposed between the pedal crank and the hub member, and a sprocket fast on a portion of said pedal crank exteriorly of said casing and engaged by a forward portion of said endless chain, back and forth adjustments of said hub member being effective to regulate the tension of said chain.

FREDERICK W. GRAFF.

REFERENCES CITED

The following references are of record in the file of this patent:

UNITED STATES PATENTS

| Number | Name | Date |
|---|---|---|
| 406,461 | Overman | July 9, 1889 |
| 459,003 | Hanson | Sept. 8, 1891 |
| 586,912 | Osmond | July 20, 1897 |
| 666,445 | Von der Heyde | Jan. 22, 1901 |